United States Patent
Bookbinder et al.

(10) Patent No.: US 7,914,724 B2
(45) Date of Patent: Mar. 29, 2011

(54) METHODS FOR EXTRUDING A HONEYCOMB ARTICLE WITH A SKIN SURRROUNDING A CENTRAL CELLULAR STRUCTURE

(75) Inventors: Dana Craig Bookbinder, Corning, NY (US); Thomas William Brew, Corning, NY (US); Frank Fabian, Horseheads, NY (US); Darin Wayne Felty, Elliston, VA (US); Robert Bernard Lubberts, Woodhull, NY (US); David Lewin Poff, Pilot, VA (US); Kenneth Charles Sariego, Beaver Dams, NY (US); Andrew Joseph Sullivan, Painted Post, NY (US); David Robertson Treacy, Jr., Elmira, NY (US)

(73) Assignee: Corning Incorporated, Corning, NY (US)

( * ) Notice: Subject to any disclaimer, the term of this patent is extended or adjusted under 35 U.S.C. 154(b) by 1065 days.

(21) Appl. No.: 11/494,914

(22) Filed: Jul. 28, 2006

(65) Prior Publication Data
US 2007/0026188 A1 Feb. 1, 2007

Related U.S. Application Data

(60) Provisional application No. 60/704,172, filed on Jul. 29, 2005.

(51) Int. Cl.
*B29C 47/00* (2006.01)
*B29C 47/12* (2006.01)
*B29C 47/88* (2006.01)
*A01J 21/00* (2006.01)
*A21C 3/00* (2006.01)
*B32B 3/00* (2006.01)

(52) U.S. Cl. ......... 264/177.12; 264/177.11; 264/177.16; 264/211.11; 425/461; 425/464; 428/73

(58) Field of Classification Search .................. None
See application file for complete search history.

(56) References Cited

U.S. PATENT DOCUMENTS

| | | | |
|---|---|---|---|
| 3,885,977 A | 5/1975 | Lachman et al. | 106/62 |
| 4,298,328 A | 11/1981 | Frost | 425/376 A |
| 4,349,329 A | 9/1982 | Naito et al. | 425/461 |
| 4,381,912 A * | 5/1983 | Yamamoto et al. | 425/461 |

(Continued)

FOREIGN PATENT DOCUMENTS
DE 3521883 A1 * 12/1985

OTHER PUBLICATIONS
Machine translation of DE 3521883 A1.*

*Primary Examiner* — Christina Johnson
*Assistant Examiner* — Benjamin Schiffman
(74) *Attorney, Agent, or Firm* — Joseph M. Homa

(57) ABSTRACT

Disclosed is a method and apparatus for forming a circumferential skin surrounding a central cellular structure of an extruded honeycomb article. The method and apparatus may be used to produce defect-free skins and/or skins having large thickness and a high degree of particle alignment thereby preferably exhibiting CTE comparable to the extruded webs. These benefits are achieved by providing a die and method wherein a flow, Q, exiting any two active ones of a plurality of peripheral slots forming the skin is substantially equal. Also disclosed is a thick-skinned ceramic article having a thick extruded skin ($t_s > 5\ t_w$) with an I-value comparable to the webs.

23 Claims, 5 Drawing Sheets

U.S. PATENT DOCUMENTS

| | | | |
|---|---|---|---|
| 4,668,176 A | 5/1987 | Zeibig et al. | 425/464 |
| 4,710,123 A | 12/1987 | Ziebig et al. | 425/464 |
| 4,915,612 A | 4/1990 | Gangeme et al. | 425/464 |
| 5,070,588 A | 12/1991 | Miwa et al. | 29/407 |
| 5,089,203 A | 2/1992 | Kragle | 264/177.11 |
| 5,219,509 A | 6/1993 | Cocchetto et al. | 264/177.12 |
| 5,256,054 A | 10/1993 | Cocchetto et al. | 425/462 |
| 5,882,694 A * | 3/1999 | Guillemette | 425/133.1 |
| 5,942,260 A * | 8/1999 | Kodama et al. | 425/190 |
| 6,247,915 B1 | 6/2001 | Miyazaki | 425/380 |
| 6,287,103 B1 | 9/2001 | Miyazaki | 425/131.1 |
| 6,455,124 B1 | 9/2002 | Beall et al. | 428/116 |
| 6,814,562 B2 | 11/2004 | Shibagaki et al. | 425/382 R |
| 6,854,969 B2 | 2/2005 | Shibagaki et al. | 425/378.1 |

\* cited by examiner

METHODS FOR EXTRUDING A HONEYCOMB ARTICLE WITH A SKIN SURRROUNDING A CENTRAL CELLULAR STRUCTURE

This application claims the benefit of U.S. Provisional Application No. 60/704,172, filed Jul. 29, 2005, entitled "Method and Apparatus for Extruding Honeycomb Articles and Thick Skinned Ceramic Honeycomb Articles Manufactured Thereby".

BACKGROUND OF THE INVENTION

This invention relates to the extrusion of honeycomb articles from plasticized ceramic-forming batch materials. More particularly, the invention relates to an improved method and apparatus for extruding honeycomb articles which include circumferential skins formed about a central cellular structure, and thick-skinned honeycomb articles produced thereby.

Skinned honeycomb extrusion of the prior art is accomplished by extruding plasticized ceramic-forming batch materials, such as cordierite ceramic-forming batch materials, through honeycomb extrusion dies to form structures having a central webbed cellular honeycomb structure surrounded by a thin integral outer skin layer. Such skins provide additional strength and a clean appearance to such honeycomb articles. Typically, the honeycomb extrusion dies employed to produce such skinned honeycomb articles are multi-component assemblies including, for example, a web-forming die body combined with a skin-forming mask. U.S. Pat. Nos. 4,349,329 and 4,298,328 exemplify die structures including skin-forming masks. The die body typically incorporates batch feedholes leading to, and intersecting with, an array of thin discharge slots formed in the die face, through which the batch material is extruded. This extrusion forms an interconnecting array of crisscrossing thin webs forming the central cellular honeycomb structure. The mask is generally a ring-like circumferential structure, typically in the form of a collar, defining the periphery of the skin of the honeycomb. The circumferential skin layer of the honeycomb article is formed by extruding the batch material between the mask and the die body.

Many of the known die constructions are designed specifically to overcome the problems of poor skin adherence to the webbed honeycomb core structure, and/or distortion of the peripheral webs of the core as the skin is joined therewith during extrusion. U.S. Pat. No. 4,349,329, for example, discloses an extrusion die particularly designed to minimize peripheral cell distortion. In that die and its operation, batch material supplied to form the skin is collected in a pooling zone 36 beneath the skin-forming die mask 1. This batch material is extruded through a skin-forming gap between the die body and mask to join with the extruded central cellular structure issuing from the die body. The central structure features thickened peripheral webs. These thickened webs resist distortion as the skin joins the central structure during extrusion.

U.S. Pat. No. 5,219,509 describes another die design wherein skin forming batch material also flows inwardly from a peripheral collection zone beneath the mask. In this design, however, skin batch flow is redirected by the mask and die body onto a flow path which is generally parallel with, with only a very slight convergence toward the honeycomb extrusion axis. This design also minimizes the distortion of web portions of the peripheral cells, in this case by limiting the lateral skin pressure applied to the peripheral cells.

U.S. Pat. No. 6,455,124 describes another design wherein batch material for the skin layer flows inwardly from a peripheral collection zone 30 beneath the mask 32 and is redirected by the mask and die body onto the skin forming gap 29. In this die design and method, the skin layer and web segments are provided with well-matched thermal expansions. In particular, I-ratios for the skin and webs are substantially the same. This is provided, in part, by extruding the skin a slower speed than the web segments which is thought to improve particle alignment.

The prior art also includes various means for controlling the thickness of the extruded skin. U.S. Pat. Nos. 4,668,176 and 4,710,123, for example, describe die designs wherein skin thickness can be controlled by controlling the width of the gap formed between the die body and mask. Also shown are means for adjusting the supply of batch material to the skin-forming region of the die.

Tightening emissions control regulations, particularly for automobiles, are requiring ceramic honeycomb designs with substantially decreased web thickness and increased channel density for improved catalytic efficiency. For example, the demand for thin-wall honeycombs, for example honeycombs having web thicknesses of 0.004 inches (0.10 mm) or less, is increasing substantially. At the same time, honeycombs incorporating greater number of cells, for example, greater than about 400 cells/in$^2$ (about channels/cm$^2$) are also in demand.

Although current extrusion die designs can be adapted to the extrusion of thin-walled honeycombs with no gross forming defects, certain new problems unique to these thin walled structures have been encountered. One significant problem is that such thin-walled structures cause lower strength in the fired ceramic article, which can lead to fractures and cracking during canning operations. Of course, one apparent way to combat the strength problem might be to provide a thicker skin to add strength. However, adding thicker skins causes additional problems. In particular, the thicker skins produced by conventional dies exhibit high internal thermal stresses that cause part failure due to thermal cycling. This occurs because of the difficulty in achieving matched coefficient of thermal expansion (CTE) between the webs and the thicker skins. The higher CTE of the skin is thought to be due to the poor degree of particle alignment in the skin achieved by current die designs. Thus, there is a need for a way of adding thicker skins to such thin-walled honeycombs, without also causing thermal stress and differential CTE problems.

As was described above, one way of combating the skin CTE issue was to extrude the skin at a slower rate than the web body, thereby attempting to achieve some level of improved preferential particle alignment in the skin. However, this may cause the skin to sometimes tear or otherwise causes the skin to separate from the webs (skin/web separation), especially in the case of thin-walled honeycombs.

Although adjustments to conventional extrusion methods and apparatus can produce defect-free fired honeycombs at conventional skin and web thicknesses, thin-walled honeycombs may suffer from extrusion defects, and in particular, skin/web separation and tears. Accordingly, there is a need for die designs which improve skin flow for thin-walled honeycombs, and also address skin defect problems.

Further, as discussed, conventional dies have had difficulty in extruding thick-skinned honeycombs having desired properties, largely because the CTE of the skins are much higher than the webs. In particular, the CTE difference is believed to be because of the relatively poor particle alignment within the skin. Thus, there is a need for an improved die design which may be utilized to form thick, well-aligned peripheral skins on honeycomb articles.

Further, conventional dies tend to wear rapidly and unevenly. Thus, extrusion lines need to be taken off-line after short runs to exchange and service the die. This results in significant undesirable down time of the extrusion lines and added manufacturing cost. Moreover, these dies tend to require many adjustments during the runs to account for uneven die wear in the skin forming regions of the die. Accordingly, die designs that are less prone to wear are also desirable.

SUMMARY OF THE INVENTION

The present invention has the advantage that it reduces the propensity for skin tears and skin/web separation by improving the alignment of batch particles in the skin. In particular, the degree of alignment achieved is preferably comparable to the degree of alignment observed in the intersecting webs of the central cellular structure of the honeycomb article. Moreover, the present invention allows for the formation of thicker-skinned articles, if desired, while maintaining the desired high degree of particle alignment. Accordingly, thick skins exhibiting low CTE may be formed thereby providing higher strength, thin-walled honeycombs. Furthermore, the present invention provides for substantially uniform die wear in the peripheral slots forming the skin. Thus, advantageously, the present invention results in improved die life, and longer run times between die maintenance intervals. Moreover, the present invention may minimize the need for die adjustments.

In a broad aspect, therefore, the invention comprises an improved method and apparatus for extruding honeycomb articles which is particularly useful for extruding thin-walled honeycomb articles. The method produces honeycomb articles having a central cellular structure with a surrounding integral peripheral skin, by extruding batch materials from a batch cavity through a plurality of central and peripheral slots. In particular, one or more of the above-described benefits are achieved by providing an equalized flow, Q, exiting any two active ones of the plurality of peripheral slots forming the skin. This equalized flow is achieved by adjusting the pressure drop, $\Delta P$, and flow resistance, Z, between the batch cavity (just upstream of the die) and the center of the skin (in a plane 26 aligned with the die face). The flow, Q, is proportional to $(\Delta P/Z)^n$, where n is an exponent comprising the power law index. The value of n is approximately 0.1 to 0.5 for such highly filled ceramic batch materials. Because it is recognized by the inventors that $\Delta P$ is lower for the slots at larger radius; Z must be likewise reduced in order to maintain Q at greater radius, R.

Equalized flow is achieved, according to one embodiment, by setting the respective lengths of the peripheral slots so as to achieve substantially the same flow exiting at least two, and preferably all of the active slots (those feeding batch material to form the skin). Equalizing the flow exiting the respective skin-forming peripheral slots is thought to substantially reduce mixing of the batch flows in the skin flow cavity, and, therefore, improve particle alignment in the skin. In combination therewith, it is preferable to also expand the width dimension, W, of the skin flow cavity as the batch material flows towards the skin forming gap, thereby further reducing mixing. Additionally, the skin is preferably extruded at substantially the same rate as the central honeycomb structure.

According to a more detailed embodiment of the invention, a method of extruding a honeycomb article is provided, comprising the steps of providing an extrusion die including a die face having a plurality of central slots, and a skin flow cavity formed adjacent to an edge of the die face, said skin flow cavity including a cavity surface having a plurality of peripheral slots, and extruding batch material from a batch cavity through the central and peripheral slots to form the honeycomb article having a skin surrounding a central cellular structure. During extruding, the flow, Q, exiting any two active ones of the plurality of peripheral slots is made to be substantially equal. Most preferably, the flow exiting any one of the active slots varies by not more than 20% from an average flow, $Q_{avg}$, across all the active slots.

According to a further broad aspect of the invention, a honeycomb extrusion die is provided, comprising a die body having a die face with a plurality of interconnected central slots formed therein for extruding batch material to form a central cellular honeycomb structure, and a skin flow cavity having a plurality of peripheral slots interconnected therewith adapted for extruding batch material to form a skin about the central cellular structure. In particular, the peripheral slots are sized to provide a designed pressure drop, $\Delta P$, and flow resistance, Z, across any two active ones of the plurality of peripheral slots, as measured between the batch cavity and a center of the skin (in a plane aligned with the die face), to achieve substantially equal flow Q exiting the slots.

Further, according to another broad aspect of the invention, a ceramic honeycomb article is provided having a thick, well aligned skin. In particular, the invention is a cellular structure comprising webs having a final web thickness, $t_{w'}$, surrounded by a peripheral skin having a final thickness, $t_{s'}$, wherein the skin includes an I-ratio substantially equal to that of the webs, and wherein $t_{s'} > 5\, t_{w'}$.

DESCRIPTION OF THE DRAWINGS

The invention may be further understood by reference to the drawings, wherein.

DETAILED DESCRIPTION OF THE PREFERRED EMBODIMENTS

Figure 1:
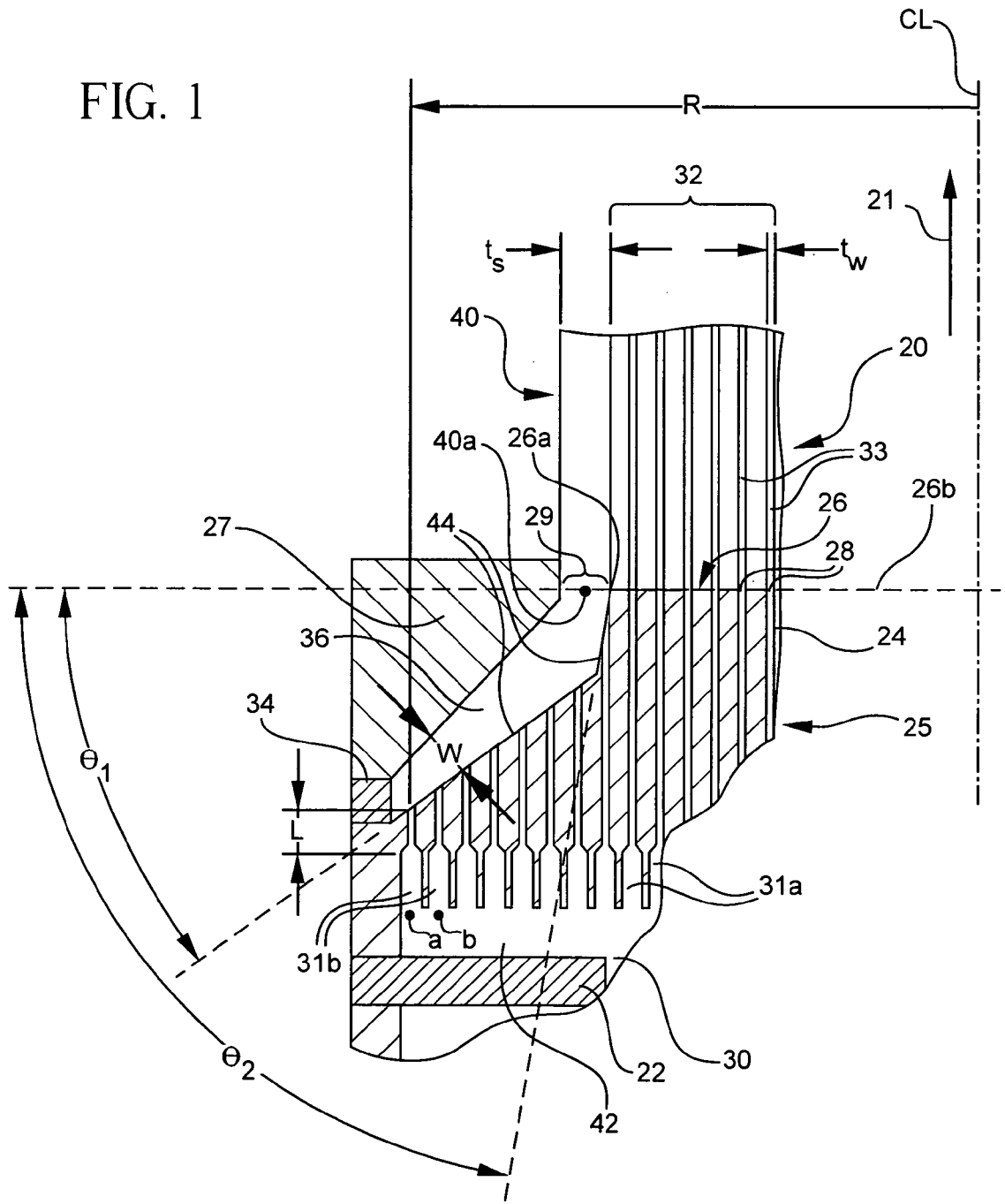
FIG. 1 is a cross-sectional view of a first embodiment of extrusion die including equalized (flow) according to the invention.
Figure 2:
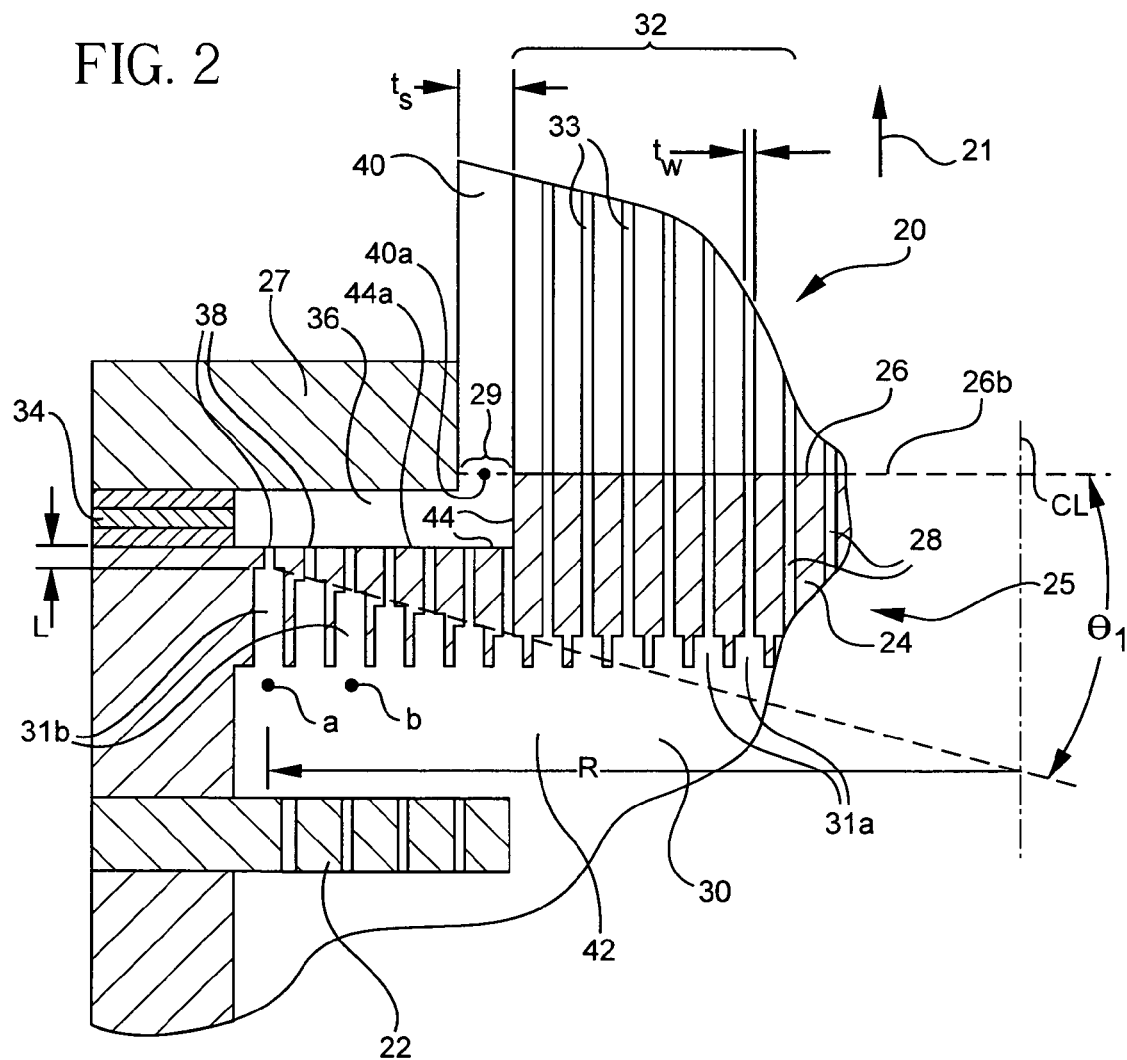
FIG. 2-5 are cross-sectional views of alternative embodiments of extrusion dies in accordance with the invention.

While the invention has wide application to the production of ceramic honeycomb products from a variety of batch mixtures of various compositions, it can be used to particular advantage with batch mixtures comprising substantial powder fractions of highly platey crystals, such as talc crystals. For example, the thermal expansion characteristics (particularly CTE) of extruded cordierite honeycomb articles along the extrusion direction depend, in large part, on an appropriate preferential alignment of talc particles within the skin and webs thereof.

Preferential talc crystal alignment, which results from batch shearing during extrusion of the batch through the relatively thin discharge slots of honeycomb extrusion dies, may result in a corresponding preferential alignment of the cordierite crystals that develop within the honeycomb webs and skin as the green honeycombs are fired. The degree of skin and web alignment is best measured by the I-ratio, as is described in U.S. Pat. No. 6,455,124. The greater the degree of preferential alignment of the talc (and the later-developed anisotropic cordierite crystals), the greater the anisotropy and the lower the critical thermal expansion properties (CTE) of the webs and skin of the cordierite ceramic honeycomb articles. Moreover, not only is low CTE desired, but well-matched CTE between the skin and web are desired, as well.

The tearing and skin/web separation observed in extruded honeycombs, although relatively subtle, is most common in honeycombs with relatively thin webs and skin layers, and particularly in thin-wall products with fired web thicknesses of less than or equal to 0.004 inches (0.1 mm) and below with thin skins. These problems may be exacerbated by extruding the skin at a slower rate than the web segments. The present invention improves over the prior art by achieving the high level of preferential particle alignment in the skin required for thermal stability and low CTE. Further, the present invention may provide skin flow rate (skin extrusion rate) that is matched in velocity with the web extrusion rate, further reducing skin/web separation. Moreover, the present invention may allow for thicker, and, therefore, stronger skins to be formed without the differential CTE issues between the skin layer and web segments of the prior art.

A variety of measures can be undertaken to control and equalize the flows exiting from the respective skin-forming slots during skin extrusion in accordance with the present invention. As shown and described relative to FIGS. 1-5, a number of extrusion die design embodiments are shown which may be used to accomplish the equalized slot flows at the slot exits. Each design delivers batch material 30 to the skin-forming gap 29 formed between the die body 24 and the mask 27, and more particularly between the edge 26a of die face 26 and the edge of the mask 27 to form a skin 40 of thickness, ts. As is conventional, the skin 40 surrounds the central cellular structure 32 and is integrally connected therewith, and together they comprise the honeycomb structure 20.

The batch material 30 from the batch cavity 42 is extruded through the plurality of peripheral slots 38 and into a skin-forming cavity 36 within the die assembly 25 upstream of the skin-forming gap 29. Simultaneously with the extrusion through peripheral slots 38, the batch material 30 from the batch cavity 42 is also extruded through the plurality of intersecting central slots 28 to form the webs 33 making up the central cellular structure 32, i.e., the honeycomb structure. Upstream from the skin-forming gap 29 as used herein means a location for the cavity 36 that lies closer to the pressurized supply of batch material 30 (from batch supply cavity 42) than does the gap. The batch supply cavity 42 may be part of suitable pressurized supply of plasticized raw material, such as a cavity of material in a ram or twin screw extrusion apparatus, for example. The batch cavity may include a flow restrictor plate 22 to aid in balancing the batch flow between the regions of the skin and the central honeycomb structure. The honeycomb structure produced may include, for example, any suitable polygonal cell design such as squares, rectangles, hexagons, octagons, circles, triangles, etc. or combinations thereof. Cell densities preferably include from 100-1200 cells/in$^2$ (about 15-190 cells/cm$^2$). Web thickness include from about 0.02-0.002 in (0.0051-0.051 mm).

In more detail, as shown and described with reference to FIGS. 1-5, the dies 25 (only a portion is shown—and not shown in true proportion or to scale) include a die body portion 24 of steel or other like rigid material incorporating a plurality of interconnecting central discharge slots 28 supplied with a plasticized ceramic batch material 30 from the batch cavity 42 through a plurality of central feedholes 31a. Batch material passes through those central discharge slots 28, flowing in an axial (extrusion) direction in FIGS. 1-5, as indicated by arrows labeled 21, and form webs 33 that intersect and collectively form the central cellular structure (indicated by bracket 32—only a portion shown for clarity) of the extruded honeycomb structure 20.

Plurality of peripheral feedholes 31b and plurality of peripheral discharge slots 38 supply portions of the same batch material 30 from the batch cavity 42 to a skin forming cavity 36 disposed adjacent to die body 24. This cavity 36 is formed in the space between die body 24 and a skin-forming mask 27, the latter being positioned adjacent die body portion 24, and preferably spaced there from by one or more annular shims or spacers 34.

The preferably annular skin layer 40 of the extruded honeycomb structure 20, is formed from a flow stream of batch material 30 supplied from batch cavity 42 at the back of the die and extruded through the peripheral slots 38 into the skin flow cavity 36. From the skin flow cavity 36, the batch material 30 then passes through the skin-forming gap 29, preferably formed as an annulus, between the die body 24 and skin-forming mask 27. The width of skin-forming gap 29 determines the initial extruded thickness of skin layer 40, $t_s$, although the final thickness of the extruded skin may be slightly different than the width of that gap due to shrinkage or other factors.

In accordance with an aspect of the invention, the flow, Q, exiting at least any two radially-spaced active ones, and preferably all of the active ones, of the peripheral slots 38 is made to be substantially equal. The flow, according to an aspect of the invention, is controlled by altering the flow resistance, Z, through each flow path as determined and measured between the batch cavity 42, at a point (labeled a, b, etc.) directly adjacent to the entry point of each of the feed holes 31b, and a center of the skin 40a in a plane 26b aligned with the die face 26 of the die body 24. It should be recognized that the overall resistance for each flow path (associated with each respective radially positioned slot 38) includes contributions due to the configuration (length and diameter) of the feed hole 31b, the length and width of the slot 38, and the length and width of the skin flow cavity 36. However, it should be recognized that the slot contribution generally dominates the flow resistance because of its substantially smaller width dimension than the other dimensions. "Active ones" as used herein means those peripheral slots 38 which are actually extruding batch material to form the skin 40. For example, slots which are covered by the shim 34 are not active (see FIG. 4).

In a most preferred embodiment, the flow exiting the at least two active ones of the plurality of peripheral slots 38 varies by not more than 20% from an average flow, $Q_{avg}$, across all the active slots 38; and more preferably not more than 10%. Thus, preferably, the flow exiting all the active slots of the plurality of peripheral slots 38 is made to be substantially equal. Having all the slot flows appropriately equalized maximizes the benefits of the invention.

Advantageously, when the flows exiting the active slots 38 are made equal, the die wear of the active peripheral slots 38 is also made substantially equal. Substantially even wear of the peripheral slots is direct evidence of when substantial flow balance is achieved. Thus, a key benefit of the invention is that one or more of the slots do not wear out prematurely relative to the other active slots. This has the additional advantage that it minimizes the need to continuously adjust the flow restrictor plate 22 positioned upstream from the die 25 which is generally done to account for batch flow changes between the supply of material to the skin 40 and the supply of batch material to the central honeycombs webs 33 due to uneven die wear.

In order to achieve flow, Q, which is made to be substantially equal, one preferred method is by adjusting a length, L, of two or more of the peripheral slots formed into the cavity surface 44. In particular, the length, L, is adjusted as a function of radius, R, from the centerline CL of the die 25. Shortening the length, L, as the radius, R, increases reduces the flow resistance and, therefore, increases the flow exiting the slot. Although such flow resistances may be modeled according to finite element fluid and computational flow methods to equalize the flows there across, as a rule of thumb, the lengths are preferably adjusted roughly such that the cut angle, $\theta_1$, is made to be approximately 30 degrees; more preferably between 20 and 40 degrees. L and $\theta_1$ are shown and defined as shown in FIGS. 1-5. The embodiment of FIG. 2 preferably includes a surface 44a of the cavity surface 44 which is substantially parallel to the die surface 26 and the length of the feedholes 31b are varied by varying the depth of the feedholes 31b. Accordingly, this results in varying of the length, L, of the slots 38. By choosing the lengths, L, appropriately as a function of the radius, R, the flow, Q, exiting at least two of the active slots 38 are made to be substantially equal. In particular, the angle, $\theta_1$, is set to be approximately 30 degrees; more preferably between 20 and 40 degrees such that the flow is substantially balanced.

Figure 4:
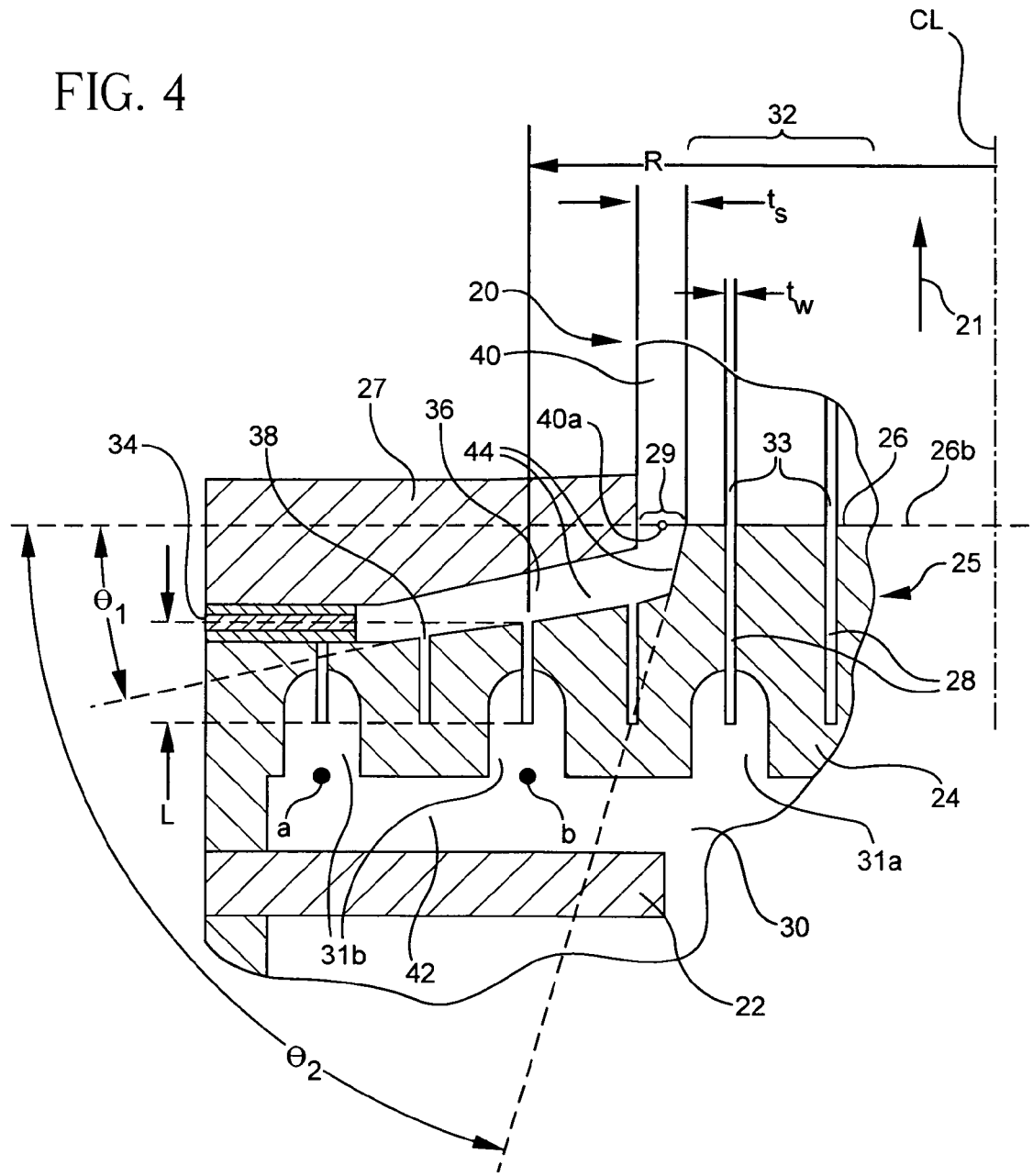

In more detail, in the embodiments of FIGS. 1 and 4, for example, the flow exiting respective ones of the slots 38 are equalized by providing an angled cut on the peripheral portion of the die body 24 into which the peripheral slots 38 are formed, i.e., an angled surface on the portion of the cavity surface 44 with which the slots 38 intersect. In particular, the cavity surface 44 includes a first incline of a preferably frustoconical surface which is formed at an angle, $\theta_1$, of approximately 30 degrees, more preferably between 20-40 degrees, as measured relative to the plane 26b of the die face 26. In these embodiments, all of the feedholes 31a, 31b are of equal length, and preferably all the slots 28, 38 have their entrance located at the same distance from the plane 26a. Thus, providing the angled cut at the desired angle on the die body provides the change in length, L, of the at least two slots 38 thereby providing the equalized pressure drops.

Figure 3:
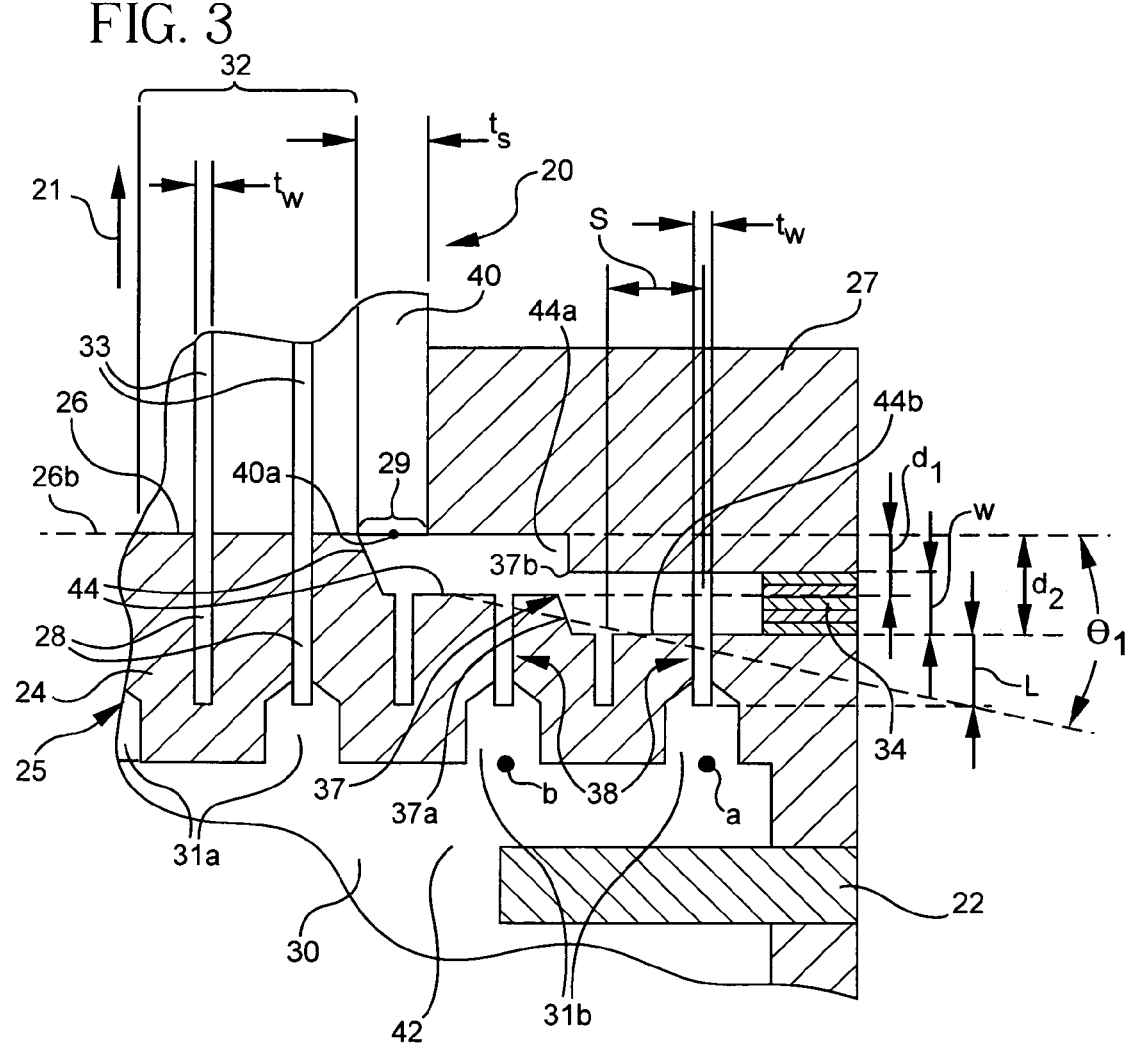

According to another embodiment, as best shown in FIG. 3, the equalized pressure drop across the at least two active slots 38 is provided by a stepped design (resembling a staircase). In particular, this design preferably comprises at least two surfaces 44a, 44b which are generally parallel to the die face 26, and to each other. These surfaces 44a, 44b are positioned at different depths, $d_1$, $d_2$, relative to the plane 26b of the die face 26. Further, at least one of the plurality of peripheral slots 38 intersects each of said at least two surfaces 44a, 44b at any cross section. In one embodiment, two or more of the slots 38 may intersect each surface in certain cross sections. Thus, in this design, on average, the flow exiting all the slots are made approximately equal. The depths d1, d2 are chosen to achieve the change is length required for flow equalization. In particular, the steps are chosen such that the cut angle, $\theta_1$, of approximately 30 degrees is achieved; more preferably between 20 and 40 degrees. The cut angle is measured at the middle of each respective step 44a, 44b. Preferably also, the width, W, of the skin flow cavity 36 is made greater at positions further towards the center of the die 25. Most preferably, the width, W, is enlarged gradually; most preferably at a rate that is roughly equivalent to the volume of material flowing into the cavity from each slot 38. Thus, the width, W, increases approximately an amount, $t_w$, for every length change equal to the slot spacing, S. According to a further detail of this embodiment, a throttled portion 37 may exist along a portion of the flow cavity 36. The throttled portion 37 may be provided to allow some adjustment of the flow from the outermost peripheral slots relative to the innermost peripheral ones. In particular, an angled surface 37a interacts with a corner 37b to allow some throttling of batch skin flow to allow some fine adjustment (by adjusting the number of shims 34) in the flows exiting the outermost slots.

Figure 5:
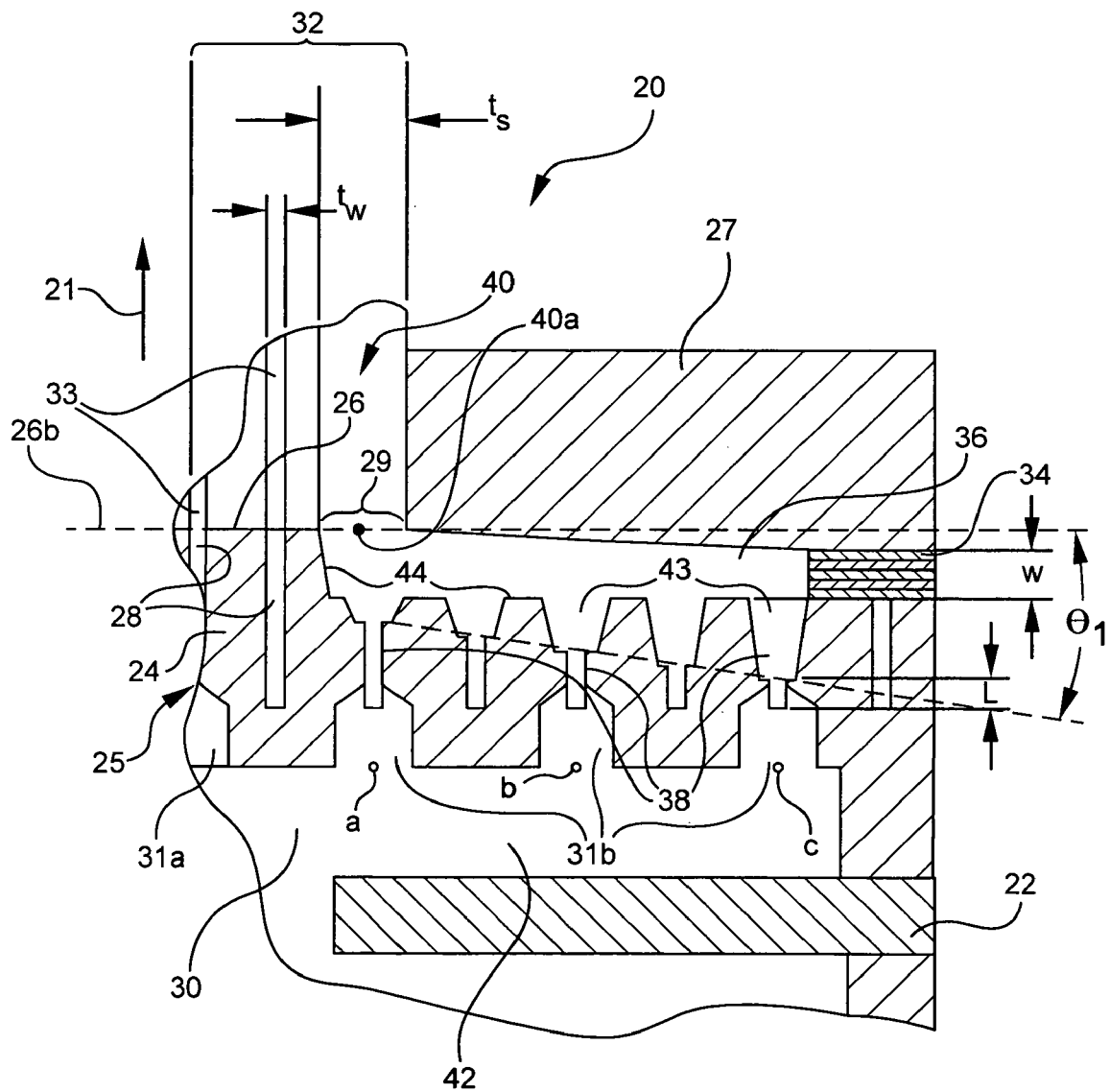

According to another embodiment, as best shown in FIG. 5, the flows, Q, exiting the at least two slots is made substantially equal by providing at least two trenches 43 formed into the cavity surface 44. The trench bottoms are preferably positioned at different depths (in the extrusion direction) from the die face 26b. At least one of the plurality of peripheral slots 38 intersects each of said at least two trenches 43. The non-equal depth of the trenches 43 causes the length, L, of the slots 38 intersecting those trenches 43 to be varied. In particular, the trenches 43 are configured such that the shorter slot lengths are located radially outwardly of the longer slots, i.e., the deeper trenches are formed at larger radii from the centerline CL. The equalized flows exiting the respective slots 38 is achieved largely by the adjustment of the lengths, L, of the slots 38 by the forming of deeper trenches at the larger radii. The trenches 43 formed into the die body 24 may be in the shape of annuluses or ovals, for example. Also, as was described before, the width, W, of the cavity 36 preferably increases at smaller radii from die centerline. Preferably, the depths of the trenches 43 vary to achieve the cut angle, $\theta_1$, of approximately 30 degrees; more preferably between 20 and 40 degrees. The cut angle is defined and measured at the center of each respective trench.

In order to ensure that the skin is formed integrally with the honeycomb web structure but without distorting the web structure, a trajectory change is preferably imparted to the skin flow within the cavity 36. Preferably, the trajectory change is accomplished by providing a suitable non-straight shape formed on the cavity surface 44 on the portion of the cavities surface located radially inward (towards the center of the die) from an outermost active slot. In the embodiments of FIGS. 1 and 4, for example, the non-straight surface comprises a first incline of a frustoconical surface which intersects with a second incline of a second frustoconical surface. The first incline consists of an angle, $\theta_1$, of preferably between 20-40 degrees and the second incline consists of an angle, $\theta_2$, of preferably between 60-80 degrees, both measured relative to a plane 26a of the die face 26. In all embodiments, it is desired that the batch flow be redirected to a substantially axial flow at the position of the plane 26a. In the FIG. 1-5 embodiments, the batch flow within the skin flow cavity 36 is redirected from a substantially radial direction within the cavity 36 to a substantially axial flow (generally parallel to the extrusion direction). However, it should be recognized that any suitable shape may be employed to accomplish the trajectory change.

Furthermore, it is preferable that the skin extrusion rate be made to be substantially the same as the web extrusion rate of the central honeycomb structure 32, i.e., the extrusions of the skin and central webbed structure are matched. Additionally, as was described for several embodiments, the trajectory change of the batch flow is preferably accompanied by a gradual expansion of a width dimension, W, of the skin flow cavity 36 as the batch material flows toward the plane 26b. This is believed to further reduce mixing.

In a die designs illustrated in FIGS. 1-5, the thickness of skin varies with the size of gap 29, which is easily measured and adjusted. Adjustment is made simply by changing the lateral offset between mask 27 and die body 24 along the radial direction by changing out the mask to one having a larger or smaller opening dimension. To provide an extruded honeycomb with a skin of a pre-determined thickness that is free of cracks, the size of skin-forming gap 29 is adjusted to provide a desired initial skin thickness. This initial thickness (roughly equal to the gap width 29 of the die) will be selected to achieve the target final skin thickness, $t_s$, for the honeycomb article. Likewise, the slot dimensions are selected to achieve the desired web thickness, $t_w$, in the fired ceramic honeycomb article.

The skin's extrusion rate is set to be preferably substantially equal to the extrusion rate of batch material from discharge slots 28 forming the webs of the central cellular structure 32. In the die design, this flow rate control is achieved by controlling batch in-flow to skin flow cavity 36, and thus the pressure of batch material within that cavity. A number of different strategies may be employed alone or in combination to achieve such flow control. First, the overall length of slots 38 supplying batch material 30 to cavity 36 can be controlled, for example, by reducing or increasing the depth of the recess in die body 10 that is cut to receive shim 34 and mask 27. The shallower this overall cut, the longer the average length of supply slots 38 versus supply slots 28 that form the webs 33 of the honeycomb 20, and the higher the relative flow impedance of slots 38 to batch material entering skin flow cavity 36.

If necessary, reductions in skin extrusion speed may be also obtained through the use of peripheral flow restrictors 22, such as plates of various descriptions provided upstream of the extrusion die. Known in the art are numerous combinations of drilled restrictor plates and flow plates for varying the level of flow restriction and to balance the flow to the skin and the supply to the webs.

As is known from U.S. Pat. No. 3,885,977, the degree of cordierite crystal alignment in cordierite ceramics can be determined by x-ray diffraction analyses of sections of the ceramic designed to ascertain crystal orientations therein. Particularly useful alignment indicators for cordierite are the reflected peak intensities from the (002) and (110) hexagonal crystallographic planes, these intensities being employed to compute an I-ratio (IR) from the formula IR=I(110)/(I(110)+I(002)) that correlates well with the degree of crystal alignment within, and coefficient of thermal expansion of, anisotropic crystalline cordierite ceramic materials.

As also disclosed in U.S. Pat. No. 3,885,977 is that ceramics incorporating randomly oriented cordierite crystals and isotropic thermal expansions typically exhibit I-ratios in the range near 0.63-0.67 on all sample axes. On the other hand, cordierite ceramics of thin cross-section produced by the extrusion of batches containing talc or clay platelets will exhibit preferential cordierite crystal alignment, resulting in anisotropic thermal expansion behavior and I-ratios differing from the random value. The '977 patent, for example, reports I-ratios below about 0.55 for anisotropic samples having a preferred cordierite crystal orientation causing lowered thermal expansion on the axis normal to the x-ray sample slice (hereinafter called lowered expansion I-ratios), and I-ratios above about 0.8 for sample slices showing increased thermal expansion on the axis normal to the slice (called increased expansion I-ratios).

In the thin-walled honeycombs, the compositions and batch preparation procedures for the core and skin sections are typically identical, so the differences in thermal expansion between web and skin samples depend largely on differences in the degree of alignment of high-aspect-ratio cordierite precursors such as clay and talc in the core and skin. With proper skin formation, the alignment of such particles, and therefore the I-ratios and thermal expansions of the core and skin sections of the fired honeycombs, can be made to be substantially equal along the extrusion direction.

Honeycomb products produced using the die configurations in accordance with aspects of the invention are expected to exhibit I-ratios for the web and skin sections that are substantially the same. For the purpose of the present description the I-ratios of the webs and skin are substantially the same if the average of the lowered expansion I-ratios for the skin, as determined from eight or more separate sample slices taken from different skin regions on the honeycomb, differs from the average I-ratio of the webs by less than 10%; more preferably less than 5%. The procedures for carrying out x-ray diffraction analyses to determine these I-ratios are well known, and reference may be made to U.S. Pat. No. 3,885,977 and other sources for a further description of those procedures.

Utilizing the skin forming dies and techniques according to the present invention described herein allows for the formation of fired ceramic honeycomb articles with thick ($t_s$>5 $t_w$), well-aligned skins, where the final web thickness is $t_w$ and the final skin thickness is $t_s$. In particular, the articles 20 so formed comprise a cellular structure having webs with a web thickness, $t_w$, surrounded by a peripheral skin having a thickness, $t_s$. Advantageously, the skin formed preferably includes an I-ratio substantially equal to that of the webs.

Of course, the foregoing examples and descriptions are merely illustrative of the invention and it will be apparent from this disclosure that numerous variations and modifications of the specific methods and apparatus hereinabove described may be resorted to by those skilled the art within the scope of the appended claims.

What is claimed is:

1. A method of extruding a honeycomb article, comprising the steps of:
   providing an extrusion die including
      a die face provided with a plurality of central slots,
      a plurality of peripheral slots that are each defined by a corresponding pair of opposed slot walls of the die body, wherein the plurality of peripheral slots are respectively spaced from one another in an outward radial direction from a centerline of the extrusion die, the plurality of peripheral slots include at least one active outer peripheral slot spaced in the outward radial direction from at least one active inner peripheral slot, and
      a skin flow cavity formed adjacent to an edge of the die face, said skin flow cavity including a cavity surface in communication with the plurality of peripheral slots; and
   extruding batch material from a batch cavity through the central and peripheral slots to form the honeycomb article having a skin surrounding a central cellular structure, wherein a flow resistance of the batch material passing through the outer peripheral slot is less than a flow resistance of the batch material passing through the inner peripheral slot,
   wherein during extruding, a flow, Q, exiting any two active ones of the plurality of peripheral slots is made to be substantially equal.

2. The method of extruding of claim 1 wherein the flow, Q, exiting any active one of the plurality of peripheral slots varies by not more than 20% from an average flow, $Q_{avg}$, across all the active ones.

3. The method of extruding of claim 1 wherein the flow, Q, exiting all active ones of the plurality of peripheral slots is substantially equal.

4. The method of extruding of claim 1 wherein the flow, Q, exiting all active ones of the plurality of peripheral slots is substantially equal, and wherein the honeycomb article is extruded such that an extrusion rate of the skin is substantially equal to an extrusion rate of the central cellular structure.

5. The method of extruding of claim 1 wherein die wear of the active ones of the plurality of peripheral slots is substantially equal.

6. The method of extruding of claim 1 wherein the flow rate, Q, is made substantially equal by adjusting a length, L, of the peripheral slots between a corresponding feed hole and the cavity surface.

7. The method of extruding of claim 1 wherein during extruding, a trajectory change of the batch flow within the skin flow cavity is accomplished by a non-straight shape formed on the cavity surface radially inward from an outermost active slot.

8. The method of extruding of claim 7 wherein the trajectory change of the batch flow is accompanied by a gradual expansion of a width dimension of the skin flow cavity as the batch material flows toward a plane of the die face.

9. The method of extruding of claim 7 wherein the trajectory change of the batch flow is from a substantially radial direction to a substantially axial direction.

10. The method of extruding of claim 7 wherein the trajectory change causes the skin to flow substantially axially at the position of a plane of the die face.

11. The method of extruding of claim 1 wherein during extruding, flow from the two active ones of the plurality of peripheral slots comprises flow into unequal depth trenches.

12. The method of extruding of claim 1 wherein during extruding, flow from the two active ones of the plurality of peripheral slots comprises flow into the skin flow cavity through at least two surfaces of the cavity surface parallel to the die face and positioned at unequal depths relative to the die face.

13. The method of extruding of claim 1 wherein during extruding, flow from the two active ones of the plurality of peripheral slots comprises flow into the skin flow cavity through a surface parallel to the die face and wherein lengths of the two active ones of the plurality of peripheral slots are different.

14. The method of extruding of claim 1 wherein during extruding, the respective dimensions of each of the peripheral slots, feed holes feeding such slots, and the peripheral flow cavity are configured such that the flow exiting each slot actively feeding the skin flow cavity is made substantially equal.

15. The method of extruding of claim 1 wherein the peripheral slots are sized to provide a designed pressure drop, $\Delta P$, and flow resistance, Z, across any two active ones of the plurality of peripheral slots, as measured between the batch cavity and a center of the skin in a plane aligned with the die face, to achieve substantially equal flow, Q, exiting the two active ones of the plurality of peripheral slots.

16. The method of extruding of claim 1, wherein the active peripheral slots each include an slot entrance located upstream from a slot exit in communication with the cavity surface, wherein at least two of the slot exits are positioned on a line at a cut angle $\theta_1$ with respect to the die face from between 20 degrees and 40 degrees.

17. The method of extruding of claim 16, wherein the cut angle $\theta_1$ is approximately 30 degrees.

18. The method of extruding of claim 1, wherein the active peripheral slots each include an slot entrance located upstream from a slot exit in communication with the cavity surface, wherein at least two of the slot entrances are positioned on a line at a cut angle $\theta_1$ with respect to the die face from between 20 degrees and 40 degrees.

19. The method of extruding of claim 18, wherein the cut angle $\theta_1$ is approximately 30 degrees.

20. A method of extruding a honeycomb article, comprising the steps of:
providing an extrusion die including
a die body including a die face provided with a plurality of central slots,
a skin flow cavity formed adjacent to an edge of the die face, said skin flow cavity including a cavity surface,
a plurality of peripheral slots that are each defined by a corresponding pair of opposed slot walls of the die body, wherein the plurality of peripheral slots are respectively spaced from one another in an outward radial direction from a centerline of the extrusion die, and the plurality of peripheral slots include at least one active outer peripheral slot spaced in the outward radial direction from at least one active inner peripheral slot,
a plurality of peripheral feed holes extending into the die body, each peripheral feed hole including a downstream end intersecting with a corresponding one of the plurality of peripheral slots, wherein each peripheral slot includes a length, L, defined between the downstream end of a corresponding feed hole and a downstream end of the peripheral slot in communication with the cavity surface; and
extruding batch material from a batch cavity through the central and peripheral slots to form the honeycomb article having a skin surrounding a central cellular structure, wherein the length of the outer peripheral slot is less than the length of the inner peripheral slot such that a flow resistance of the batch material passing through the outer peripheral slot is less than the flow resistance of the batch material passing through the inner peripheral slot,
wherein during extruding, a flow, Q, exiting any two active ones of the plurality of peripheral slots is made to be substantially equal.

21. The method of extruding of claim 20, wherein the down stream ends of the peripheral slots are positioned on a line at a cut angle $\theta_1$ with respect to the die face from between 20 degrees and 40 degrees.

22. A method of extruding a honeycomb article, comprising the steps of:
providing an extrusion die including
a die body including a die face, a plurality of central slots in communication with the die face, and a plurality of peripheral slots respectively spaced from one another in an outward radial direction from a centerline of the extrusion die,
a skin flow cavity formed adjacent to an edge of the die face, said skin flow cavity including a cavity surface in communication with a corresponding downstream end of each of the peripheral slots,
a plurality of peripheral feed holes extending into the die body, each peripheral feed hole including a downstream end intersecting with a corresponding one of the plurality of peripheral slots, wherein each peripheral slot includes a length, L, defined between the downstream end of a corresponding feed hole and the downstream end of the peripheral slot, wherein the lengths of the spaced peripheral slots are successively less than one another along the outward radial direction; and
extruding batch material from a batch cavity through the central and peripheral slots to form the honeycomb article having a skin surrounding a central cellular structure, wherein the successively reduced lengths of the spaced peripheral slots successively reduce the flow resistance of the batch material passing through the respective peripheral slots,
wherein during extruding, a flow, Q, exiting any two active ones of the plurality of peripheral slots is made to be substantially equal.

23. The method of extruding of claim 22, wherein the down stream ends of the peripheral slots are positioned on a line at a cut angle $\theta_1$ with respect to the die face from between 20 degrees and 40 degrees.

* * * * *

UNITED STATES PATENT AND TRADEMARK OFFICE
CERTIFICATE OF CORRECTION

| | | |
|---|---|---|
| PATENT NO. | : 7,914,724 B2 | Page 1 of 1 |
| APPLICATION NO. | : 11/494914 | |
| DATED | : March 29, 2011 | |
| INVENTOR(S) | : Dana Craig Bookbinder et al. | |

It is certified that error appears in the above-identified patent and that said Letters Patent is hereby corrected as shown below:

On the Title Page, Item (54) Title and Col. 1, lines 1-4, Description should read, METHODS FOR EXTRUDING A HONEYCOMB ARTICLE WITH
A SKIN SURROUNDING A CENTRAL CELLULAR STRUCTURE Signed and Sealed this
Twenty-eighth Day of February, 2012

David J. Kappos
*Director of the United States Patent and Trademark Office*